United States Patent [19]

Wegmann et al.

[11] 4,257,540
[45] Mar. 24, 1981

[54] HAND-HELD BATTERY-POWERED GREASE GUN

[75] Inventors: Jerome B. Wegmann, St. Louis County; Norbert F. Cook, Florissant, both of Mo.

[73] Assignee: McNeil Corporation, Akron, Ohio

[21] Appl. No.: 954,976

[22] Filed: Oct. 26, 1978

[51] Int. Cl.³ .............................................. B67D 5/40
[52] U.S. Cl. .................... 222/262; 184/105 A; 222/324; 222/327; 222/333; 222/383; 239/332; 417/411
[58] Field of Search ................ 222/262, 263, 323–327, 222/333, 383, 473; 74/49, 55, 421 A, 570; 417/411, 501; 239/332; 184/28, 38 R, 105 A

[56] References Cited

U.S. PATENT DOCUMENTS

| | | | |
|---|---|---|---|
| 1,185,197 | 5/1916 | Hartford | 74/421 R |
| 2,276,207 | 3/1942 | Klein | 222/262 X |
| 2,626,085 | 1/1953 | MacKinnon | 222/262 |
| 2,694,500 | 11/1954 | Petrenchak | 222/123 |
| 2,928,574 | 3/1960 | Wagner | 222/263 X |
| 3,641,828 | 2/1972 | Ryan | 74/49 |
| 3,776,666 | 12/1973 | Ludwig | 417/411 |
| 3,807,606 | 4/1974 | Forest et al. | 222/262 |
| 3,931,914 | 1/1976 | Hosaka et al. | 222/333 X |
| 3,993,250 | 11/1976 | Shure | 222/383 X |
| 4,024,994 | 5/1977 | Davis, Jr. | 222/326 |
| 4,030,665 | 6/1977 | Koyama | 222/333 |
| 4,033,511 | 7/1977 | Chamberlin | 222/383 X |

FOREIGN PATENT DOCUMENTS 816003  4/1937  France ........................ 74/414

Primary Examiner—David A. Scherbel
Assistant Examiner—Fred A. Silverberg
Attorney, Agent, or Firm—Senniger, Powers, Leavitt and Roedel

[57] ABSTRACT

A hand-held, battery-powered dispenser for pumpable materials such as lubricants and, in particular, lubricating grease, comprising a handle, a head, a barrel secured to the head holding a supply of lubricant and a plunger slideable within a bore in the head. The bore intersects an inlet port in communication with the barrel and is in communication with an outlet port for the delivery of the lubricant under pressure. The plunger is reciprocated in the bore through a pressure stroke and a return stroke by a motor in the handle operating a drive mechanism in the head connected to the plunger. The user operates the motor by actuating a switch in the handle which completes a circuit connecting rechargeable batteries in the handle with the motor. A flywheel in the drive mechanism permits significant reductions in the size and weight of the motor and batteries so that the dispenser can be light enough and small enough to be hand-held during operation, yet capable of delivering the lubricant under high pressure.

3 Claims, 11 Drawing Figures

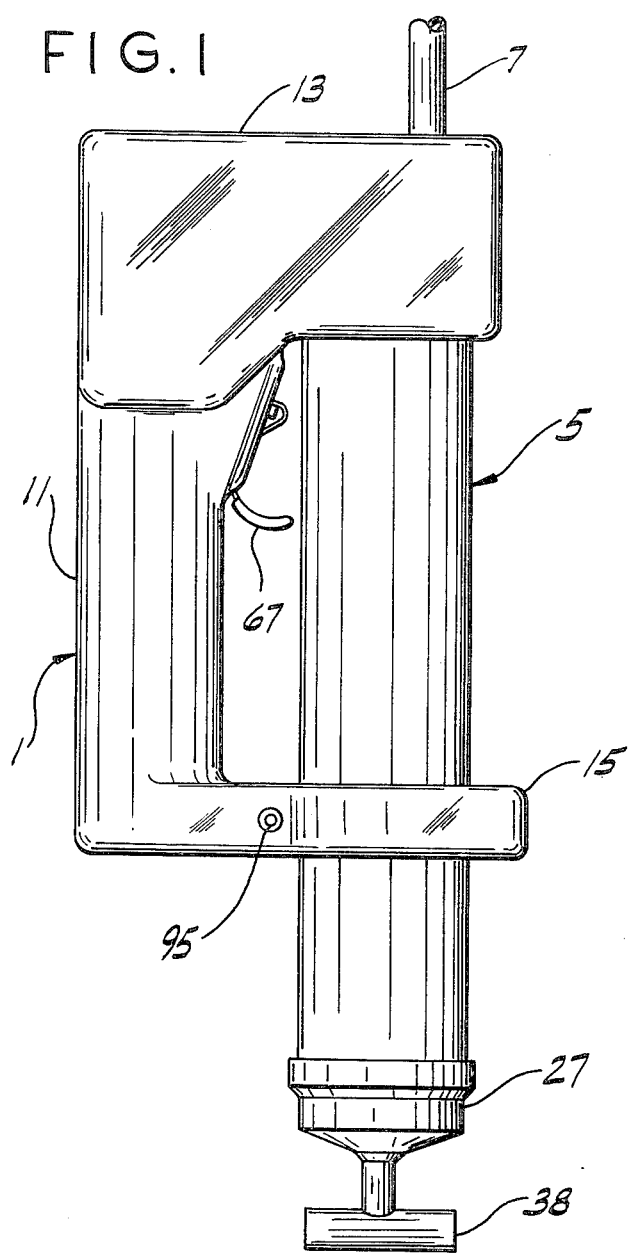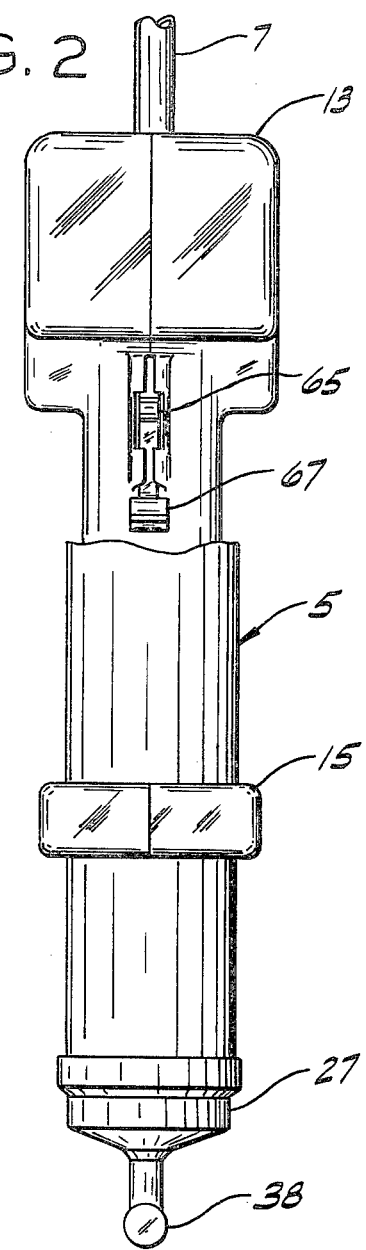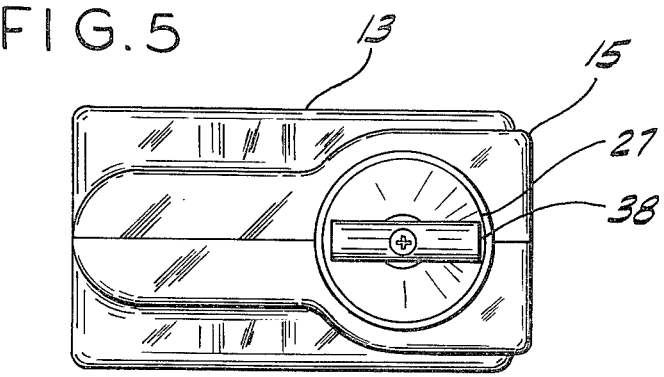

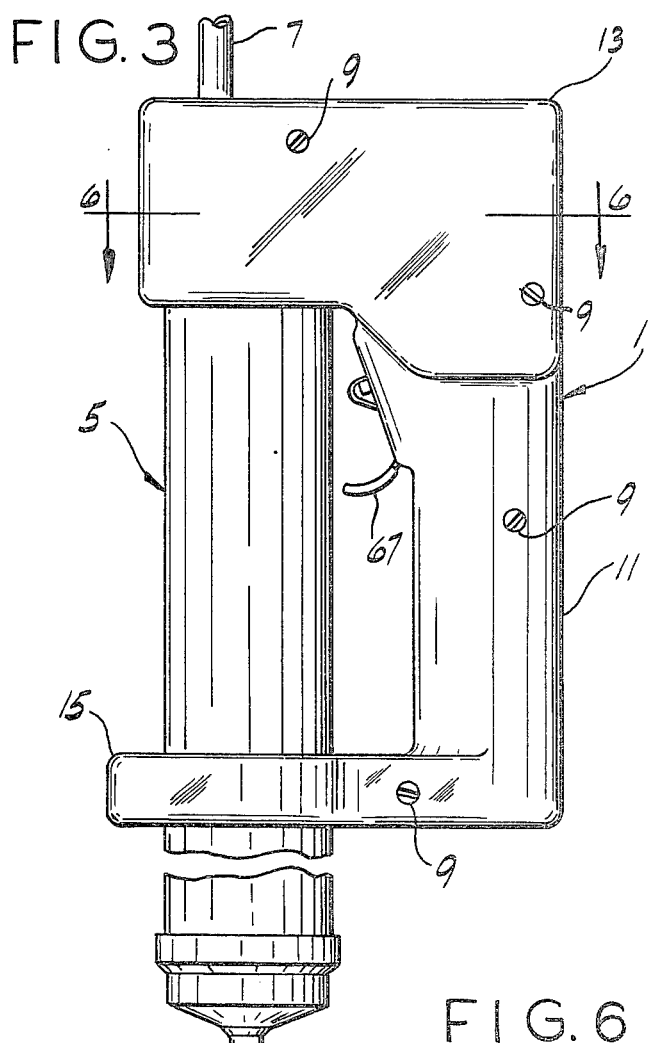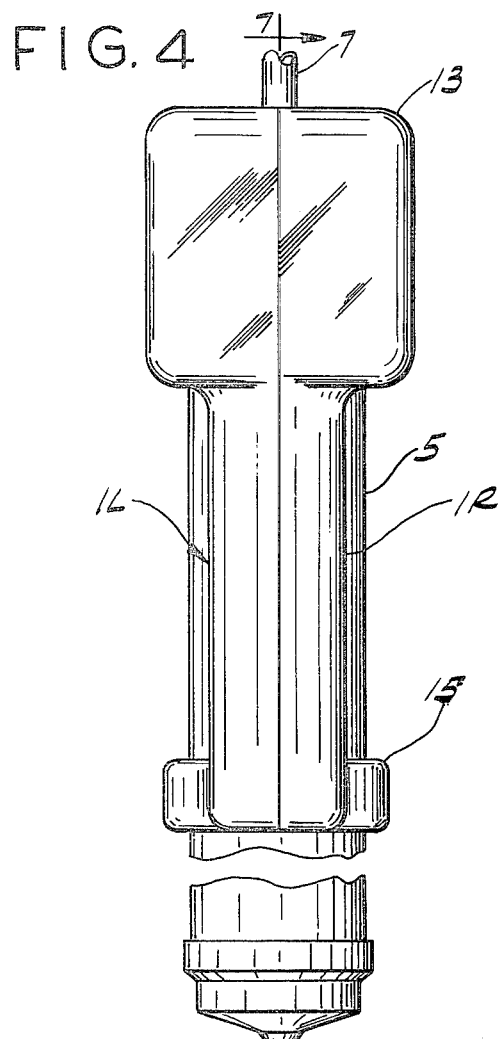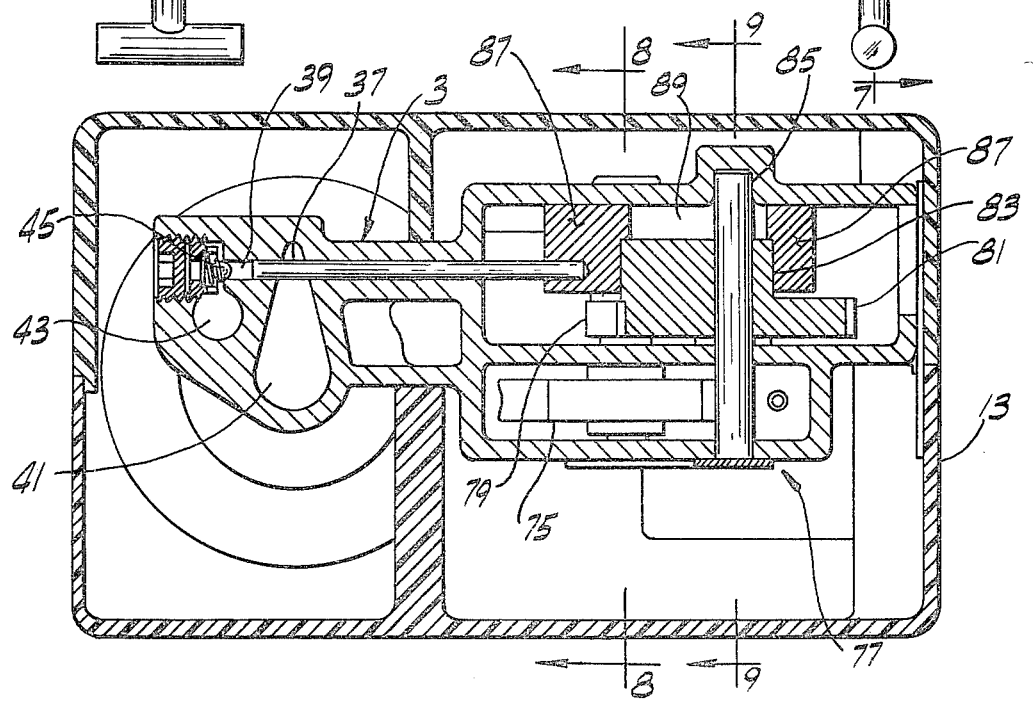

HAND-HELD BATTERY-POWERED GREASE GUN

BACKGROUND OF THE INVENTION

This invention relates to portable, electrically powered dispensers for pumpable material such as lubricant, and more particularly to a hand-held electrically powered grease gun.

Reference may be made to U.S. Pat. Nos. 2,626,085 and 2,928,574 showing hand-held electrically powered grease guns wherein a motor is powered by an external power supply. This invention is especially concerned with a hand-held battery-powered grease gun, the batteries being contained for use of the gun independently of any external power supply.

SUMMARY OF THE INVENTION

Among the several objects of this invention may be noted the provision of an improved portable, electrically powered dispenser of the type described, adapted to have a self-contained power supply in the form of rechargeable batteries, while being small enough and light enough to be hand-held during operation.

Briefly, the dispenser of the instant invention comprises a head, a handle that extends laterally of the head and a barrel holding a supply of grease removably secured to the head. The head has a bore therein that forms a pump cylinder. The head also has an inlet port in communication with the bore and the material in the barrel and an outlet port at one end of the bore. Sliding within the bore is a plunger that reciprocates past the inlet port toward the outlet port during the pressure stroke to force material out the outlet and that reciprocates away from the outlet port past the inlet port during the return stroke to prime the pump. The handle extends from the head alongside the barrel. Batteries and a motor to power the plunger movement and a switch to control the operation thereof are secured in the handle. A drive means in the head converts the rotary output of the motor to the reciprocating motion of the plunger. A flywheel stores the excess energy available from the motor during the return stroke and releases it during the pressure stroke.

Other objects and features will be in part apparent and in part pointed out hereinafter.

BRIEF DESCRIPTION OF THE DRAWINGS

FIG. 1 is a right side elevation view of apparatus embodying this invention;

FIG. 2 is a front elevation view thereof;

FIG. 3 is a left side elevation view thereof;

FIG. 4 is a rear elevation view thereof;

FIG. 5 is a bottom plan view thereof;

FIG. 6 is an enlarged section on line 6—6 of FIG. 3 showing the pump means and drive means;

Corresponding reference characters indicate corresponding parts throughout the several views of the drawings.

DESCRIPTION OF A PREFERRED EMBODIMENT

Figure 7:
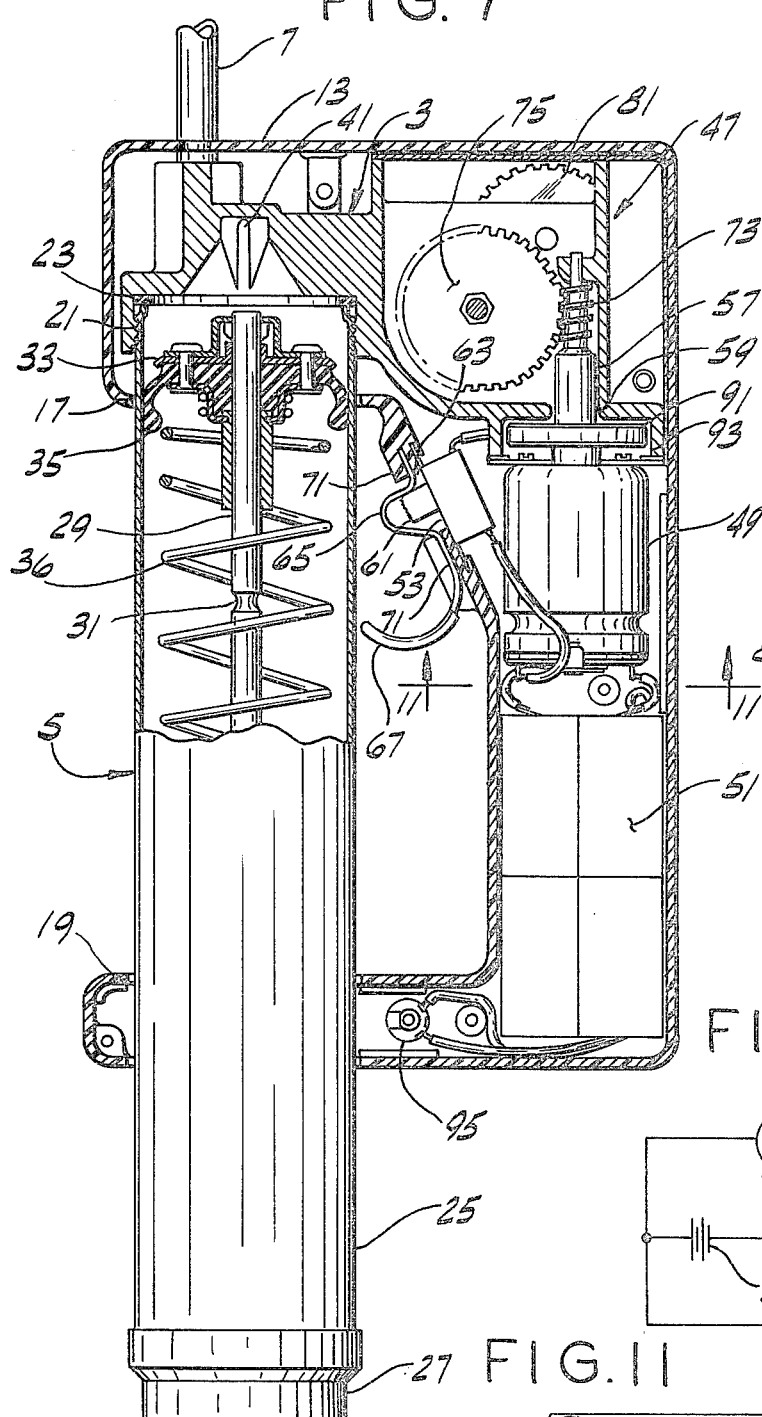
FIG. 7 is an enlarged section on line 7—7 of FIG. 4 showing the pump means, drive means, motor, batteries and switch.
Figure 8:
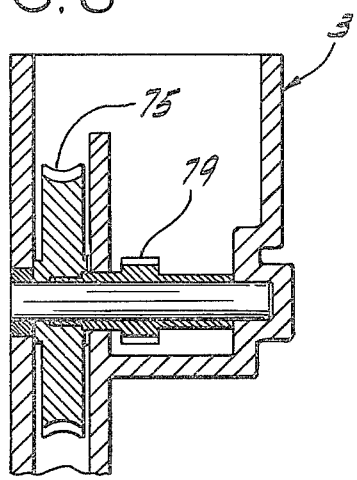
FIG. 8 is a section on line 8—8 of FIG. 6 showing details of the drive means.
Figure 9:
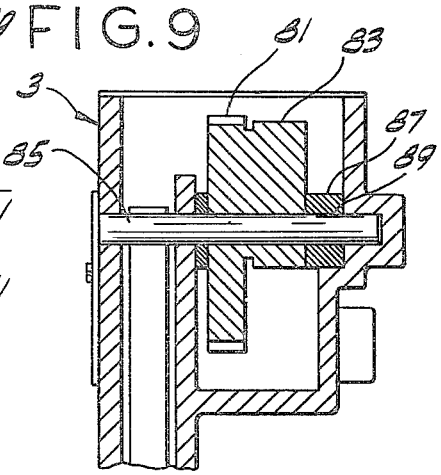
FIG. 9 is a section on line 9—9 of FIG. 6 showing details of the drive means.

Referring to the drawings, a dispenser of this invention is shown to comprise a housing assembly indicated generally at 1 enclosing a head 3 to which is removably secured a barrel 5 holding a supply of the material to be dispensed. The head has pump means therein for pumping material under relatively high pressure from the barrel through a delivery pipe 7 extending from the head. The dispenser is particularly adapted for dispensing grease, and will therefore be hereinafter referred to as a grease gun, but it will be understood that it may be used for dispensing various other pumpable materials, such as sealants.

The housing assembly is a two-part casing or shell structure, the two parts of which are designated 1L and 1R. These parts, which may be molded of plastic, for example, are formed so that the housing assembly is in effect split in half on its central longitudinal plane, part 1L forming the left-hand half and part 1R forming the right-hand half of the assembly (left and right being as viewed by the user holding the gun in his right hand with the head 3 at the top). Parts 1L and 1R are removably secured together by suitable conventional means, such as the screws indicated at 9.

The housing assembly, as viewed from one side (which would be its right side as shown in FIG. 1) is generally of C-shape, having a handle 11 adapted to be grasped in the hand, a top or head portion 13 enclosing the head 3 extending forward from the upper end of the handle ("forward" is with respect to the hand) and a yoke 15 extending forward from the lower end of the handle. The handle is tubular, of a length (height) somewhat greater than the width of the hand and of a girth such that it may be readily grasped in the hand of a user i.e., about 5.5 inches (14 centimeters) in circumference.

The head portion 13 of the housing assembly 1 is generally of rectangular shape with rounded corners as shown in FIG. 5. The bottom of the head portion 13 and the yoke 15 have circular openings 17 and 19, respectively, therein coaxial with and of approximately the same diameter as a circular screw-threaded recess or socket 21 in the head 3 receiving the screw-threaded upper end of the barrel 5 (see FIG. 7). The barrel 5 is sealed to the head 3 by washer 23 and comprises a cylinder 25 closed at its end away from the head 3 by a cap 27 in which is a circular opening notched sidewise. Passing through the opening is a piston rod 29 grooved as shown at 31 for hanging engagement with the notch in the cap 27 when said grooved portion of the piston rod 29 is drawn back to the opening in the cap and moved sidewise. A piston 33 is affixed on the end of the piston rod 29 toward the head. Attached to the piston 33 and extending therefrom in sealing sliding engagement with the interior wall surface of the cylinder 25 is a rubber packing diaphragm 35. A compression spring 36 surrounding the piston rod 29 biases the piston 33 and attached packing diaphragm toward the head 3 and forces grease from the barrel 5 into the head 3. To refill the barrel 5 with grease the barrel 5 may be unscrewed from the head and the rod 29 may be drawn back by pulling on a handle 38 affixed to the end of the rod 29 toward the cap 27 so as to bring the groove 31 back to the notch in the cap 27.

The pump means comprises a plunger 37 slideably mounted within a bore 39 in the head 3 that extends laterally with respect to the barrel 5 (see FIG. 6). The bore is in communication with the supply of material in the barrel 5 through an inlet port 41 in the head that intersects the bore and is in communication with the recess 21. At an end of the bore spaced from the inlet port, there is an outlet port 43 with an outlet check valve 45 therein. Connected to the outlet is the delivery pipe 7, which may have a nozzle (not shown) at its end.

The plunger 37 slides in the bore 39 across the inlet 41 toward the check valve at outlet 43 during its pressure stroke to compress the grease within the bore 39 and to force it out past the check valve 45 to the delivery pipe 7 under pressure. Once the pressure stroke has been completed, the plunger moves back through its return stroke away from the check valve 45 and back across the inlet port 41 thereby drawing material into the bore 39 to prime it.

As shown in FIG. 7, the plunger 37 is driven through its pressure and return strokes via drive means 47 in the head 3 powered by an electric motor 49 in the handle 11. The motor is energized via batteries 51, (e.g., rechargeable batteries such as nickel-cadmium batteries), a switch 53 and a circuit interconnecting these components. Conventional fastening means, such as the screws indicated at 55, secure the electric motor 49 to the bottom of the head 3 with its output shaft 57 extending up into the head through the opening 59 (see FIGS. 7 and 11). The batteries 51 are lodged in the space in the handle beneath the motor 49. The switch 53 is mounted on the side of the handle 11 toward the barrel 5 and adjacent the head portion 13 of the housing assembly so that it can be readily reached by the forefinger of a user holding the handle in his hand. The body of the switch 53 is secured to the inside of the housing assembly 1 while the switch lever 61 projects out beyond the housing assembly through an opening 63 therein. A cover piece 65 with a trigger-shaped end 67 is slideably mounted in slots 71 in the handle 11 at the opening. The cover piece 65 is shaped to extend over and engage the projecting switch lever so that pulling on the trigger-shaped end 67 results in moving the switch lever 61 away from a first position in which the motor is deenergized and the batteries 51 can be recharged to a second position in which the batteries 51 are connected to the motor 49 for energizing it, the electrical circuit being shown in FIG. 10.

The drive means 47 in the head is operable by motor 49 for reciprocating the plunger 37 in the bore 39. The drive means comprises a worm 73 on the motor output shaft 57 in mesh with a worm gear 75 of a gear cluster 77, this cluster including a pinion 79. The latter meshes with a spur gear 81 having a relatively large-diameter crank pin 83, the spur gear 81 being rotatable on a gear shaft 85 mounted in the head 3. The drive means 47 further comprises a crank follower 87 having first and second portions, the first portion having an opening receiving the crank pin 83, the second portion having a slot 89 receiving the shaft 85, the longitudinal axis of the slot being parallel to that of the bore 39. As the spur gear 81 rotates and the crank pin 83 rotates with it about the axis of shaft 85, the surfaces of the first portion of the crank follower 87 defining the opening are engaged by the crank pin and the crank follower 87 reciprocates back and forth toward and away from the right-hand end of the bore 39 as viewed in FIG. 6. The engagement of the surfaces of the second portion of the crank follower defining the slot 89 with the shaft 85 prevents transverse movement of the crank follower. The plunger 37 is attached to the left end of the crank follower 87, as shown in FIG. 6. The drive means 47 thus operates to convert the rotation of the rotary output shaft 57 to the reciprocation of the plunger 37 longitudinally within the bore and to increase the torque of the motor available to reciprocate the plunger.

The plunger 37, as indicated above, reciprocates through a pressure stroke and a return stroke. The pressure stroke of the plunger requires greater power from the motor than does the return stroke so that a motor developing enough power to move the plunger through the pressure stroke will then be capable of developing excess, unused power during the return stroke. A flywheel 91 is utilized to store this excess available energy during the return stroke and to release the stored energy during the pressure stroke to assist the motor 49. This energy storage feature permits the use of a less powerful motor (hence, one that is smaller and lighter) than that required for the unassisted movement of the plunger through the pressure stroke. Further, the peak demand on the batteries 51 is correspondingly reduced so that they too can be made smaller and lighter than the batteries which would otherwise be needed for an unassisted motor. In addition, the flywheel 91 operates in combination with the reciprocating plunger 37 to present a more or less constant loading condition on the motor 49 by placing a power demand on the motor when the power needed for the plunger movement is low (i.e., the return stroke) and by reducing the power required of the motor when the power needed for the plunger movement is high (i.e., the pressure stroke). Since electrical motors operate most efficiently at or near their rated load capacity, the constant loading condition provided by the flywheel 91 permits a close match of the motor capacity and loading resulting in more efficient operation of the motor 49 and less power usage from the batteries 51. Together these effects of assisting the motor and of more efficient motor operation enable a substantial reduction in the size and the weight of the batteries 51 and motor 49 of the dispenser. Without the flywheel, the motor and batteries necessary to pump grease at relatively high pressure may have to be so large and heavy that a hand-held battery-powered grease gun would not be feasible.

Of importance is the attachment of the flywheel 91 to the output shaft 57 of the motor rather than elsewhere in the drive. Since the output shaft 57 is the element in the drive means having the highest rotating speed and the amount of energy stored by a flywheel is a function of its speed of rotation squared, the flywheel 91 has the maximum energy storage capability when mounted on the motor shaft 57. As shown in FIG. 7, the flywheel is mounted on the shaft 57 in a recess 93 in the head between the drive means 47 and motor 49.

Figure 10:
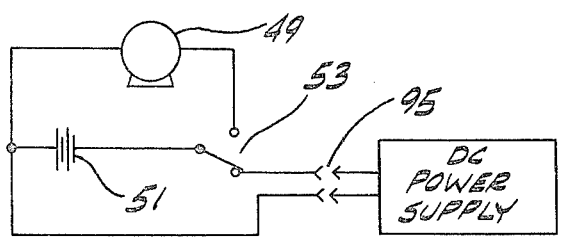
FIG. 10 is a schematic of the circuit interconnecting the electrical components.
Figure 11:
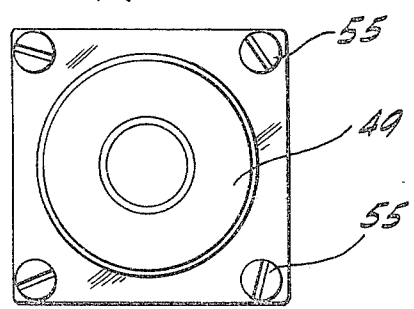
FIG. 11 is a view on the line 11—11 of FIG. 7 showing the means mounting the motor to the head.

To recharge the batteries when the grease gun is not in use, a receptacle 95 (see FIG. 7) is provided in the dispenser at the lower end of the handle 11 near the yoke 15 engageable by a plug of a D.C. power supply (not shown). The receptacle is connected into the circuit as shown in FIG. 10. When the plug of the D.C. power supply is inserted in the receptacle 95 and the switch 53 is in its first position (i.e., its motor-off recharging position) electrical power is supplied from the D.C. power supply to the batteries 51 to recharge them.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense

What is claimed is:

1. A hand-held battery-powered dispenser for lubricant or other pumpable material such as lubricating grease, comprising:

a barrel holding a supply of said material;

a head at one end of the barrel extending laterally from the barrel having a bore therein constituting a pump cylinder extending laterally with respect to the barrel;

a plunger slidable in the bore;

the head having an inlet intersecting the bore in communication with the barrel for the flow of said material from the barrel to the bore and an outlet for the bore spaced from the inlet toward one end of the bore;

the plunger being slidable in the bore across the inlet toward said one end of the bore through a pumping stroke for pumping said material under pressure out through the outlet, and away from said one end of the bore through a return stroke for priming the bore;

means forming a handle, the handle being tubular and extending from the head alongside the barrel, the axis of the handle being generally parallel to that of the barrel, the handle being so sized and spaced from the barrel as to enable a user to grasp and hold the dispenser in one hand by the handle with the hand of the user substantially surrounding the handle and with the fingers of the user extending into the space between the handle and the barrel;

an electric motor in the handle at the end thereof toward the head, said motor having an output shaft, the axis of the shaft extending generally parallel to the axis of the handle;

a battery means received within the handle at the end thereof away from the head for energizing the motor, a circuit interconnecting the battery means and the motor including a switch operable by a user holding the dispenser in his hand by the handle for starting and stopping the motor;

drive means in the head operable by the motor for reciprocating the plunger comprising gear means rotatably mounted in the head and means interconnected with the gear means and the plunger for reciprocating the plunger longitudinally within the bore;

and a flywheel on said shaft for storing energy developed during each return stroke and releasing the stored energy to assist in moving the plunger during each pressure stroke, said shaft extending from the motor into the head and interconnected with the drive means;

the means for reciprocating the plunger comprising a rotary member in the head having a crank pin thereof, and a crank follower having an opening therein receiving the crank pin, said follower being reciprocated by the crank pin upon rotation of the rotary member for reciprocation of the plunger longitudinally within the bore;

the gear means comprising a worm on said motor shaft, a gear shaft, and a gear on said gear shaft, said crank pin being on the gear, said crank follower having a slot receiving the gear shaft for preventing transverse movement of the crank follower.

2. A dispenser as set forth in claim 1 wherein the drive means further comprises a gear train in which the worm on the motor shaft meshes with a gear cluster comprising a worm gear, and a pinion coaxial with the worm gear that meshes with the said gear having the crank pin thereon.

3. A hand-held battery-powered dispenser for lubricant or other pumpable material such as lubricating grease, comprising:

a barrel holding a supply of said material;

a head at one end of the barrel extending laterally from the barrel having a bore therein constituting a pump cylinder extending laterally with respect to the barrel;

a plunger slidable in the bore;

the head having an inlet intersecting the bore in communication with the barrel for the flow of said material from the barrel to the bore and an outlet for the bore spaced from the inlet toward one end of the bore;

the plunger being slidable in the bore across the inlet toward said one end of the bore through a pumping stroke for pumping said material under pressure out through the outlet, and away from said one end of the bore through a return stroke for priming the bore;

means forming a handle, the handle being tubular and extending from the head alongside the barrel, the axis of the handle being generally parallel to that of the barrel, the handle being so sized and spaced from the barrel as to enable a user to grasp and hold the dispenser in one hand by the handle with the hand of the user substantially surrounding the handle and with the fingers of the user extending into the space between the handle and the barrel;

an electric motor in the handle at the end thereof toward the head, said motor having an output shaft, the axis of the shaft extending generally parallel to the axis of the handle;

a battery means received within the handle at the end thereof away from the head for energizing the motor, a circuit interconnecting the battery means and the motor including a switch operable by a user holding the dispenser in his hand by the handle for starting and stopping the motor;

drive means in the head operable by the motor for reciprocating the plunger comprising gear means rotatably mounted in the head and means interconnected with the gear means and the plunger for reciprocating the plunger longitudinally within the bore;

and a flywheel on said shaft for storing energy developed during each return stroke and releasing the stored energy to assist in moving the plunger during each pressure stroke, said shaft extending from the motor into the head and interconnected with the drive means;

the handle being part of a housing formed to enclose the head and to contain the battery means and the motor, said housing being a two-part housing split in a plane extending generally longitudinally and centrally of the handle and the barrel, with means for removably securing the parts of the housing together, said parts being formed to provide an enclosure for the head with an opening in said enclosure for the barrel, the barrel extending through said opening;

the two parts of the housing being formed to provide a yoke for the barrel at the end of the handle opposite the enclosure for the head.

* * * * *